(12) United States Patent
Brooks

(10) Patent No.: US 6,230,745 B1
(45) Date of Patent: May 15, 2001

(54) PIPE HEATING DEVICE

(76) Inventor: Cullen Brooks, 4862 Ivy St., East Chicago, IN (US) 46312

( * ) Notice: Subject to any disclaimer, the term of this patent is extended or adjusted under 35 U.S.C. 154(b) by 0 days.

(21) Appl. No.: 09/595,461

(22) Filed: Jun. 16, 2000

(51) Int. Cl.$^7$ .................................................. E03B 7/14
(52) U.S. Cl. ........................... 138/33; 138/35; 219/229; 219/477; 219/643
(58) Field of Search ........................... 138/32, 33, 35; 219/643, 228, 229, 477

(56) References Cited

U.S. PATENT DOCUMENTS

| | | | | |
|---|---|---|---|---|
| 1,316,190 | * | 9/1919 | Sackerman | 138/33 |
| 1,972,186 | * | 9/1934 | Davis | 219/477 |
| 2,470,854 | * | 5/1949 | Kovac | 138/33 |
| 2,620,430 | * | 12/1952 | Trowbridge | 138/33 |
| 2,974,717 | * | 3/1961 | Lindsay | 156/502 |
| 3,519,023 | * | 7/1970 | Burns, Sr. et al. | 138/33 |
| 5,412,184 | * | 5/1995 | McGaffigan | 219/643 |
| 5,743,017 | * | 4/1998 | Dreher et al. | 219/229 |
| 6,060,695 | * | 5/2000 | Härle et al. | 219/229 |

\* cited by examiner

Primary Examiner—James Hook

(57) ABSTRACT

A pipe heating device for conveniently thawing out pipelines. The pipe heating device includes a scissor-like member including a first elongate member having a first end, a second end, and an intermediate portion, and also including a second elongate member having a first end, a second end, and an intermediate portion which is hingedly attached to the intermediate portion of the first elongate member; and also includes a first semi-cylindrical member having ends, side edges and being securely attached to the first end of the first elongate member; and further includes a second semi-cylindrical member having ends, side edges and being securely attached to the first end of the second elongate member with each of the side edges of the second semi-cylindrical member being in contactable relationship with a respective one of the side edges of the first semi-cylindrical member; and also includes a heating assembly for heating the first and second semi-cylindrical members.

10 Claims, 2 Drawing Sheets

PIPE HEATING DEVICE

BACKGROUND OF THE INVENTION

1. Field of the Invention

The present invention relates to a portable water line heating device and more particularly pertains to a new pipe heating device for conveniently thawing out pipelines.

2. Description of the Prior Art

The use of a portable water line heating device is known in the prior art. More specifically, a portable water line heating device heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,726,394; U.S. Pat. No. 5,522,407; U.S. Pat. No. Des. 274,601; U.S. Pat. No. 5,141,186; U.S. Pat. No. 4,787,583; and U.S. Pat. No. 5,009,376.

While these devices fulfill their respective, particular objectives and requirements, the aforementioned patents do not disclose a new pipe heating device. The inventive device includes a scissor-like member including a first elongate member having a first end, a second end, and an intermediate portion, and also including a second elongate member having a first end, a second end, and an intermediate portion which is hingedly attached to the intermediate portion of the first elongate member; and also includes a first semi-cylindrical member having ends, side edges and being securely attached to the first end of the first elongate member; and further includes a second semi-cylindrical member having ends, side edges and being securely attached to the first end of the second elongate member with each of the side edges of the second semi-cylindrical member being in contactable relationship with a respective one of the side edges of the first semi-cylindrical member; and also includes a heating means for heating the first and second semi-cylindrical members.

In these respects, the pipe heating device according to the present invention substantially departs from the conventional concepts and designs of the prior art, and in so doing provides an apparatus primarily developed for the purpose of conveniently thawing out pipelines.

SUMMARY OF THE INVENTION

In view of the foregoing disadvantages inherent in the known types of portable water line heating device now present in the prior art, the present invention provides a new pipe heating device construction wherein the same can be utilized for conveniently thawing out pipelines.

The general purpose of the present invention, which will be described subsequently in greater detail, is to provide a new pipe heating device which has many of the advantages of the portable water line heating device mentioned heretofore and many novel features that result in a new pipe heating device which is not anticipated, rendered obvious, suggested, or even implied by any of the prior art portable water line heating device, either alone or in any combination thereof.

To attain this, the present invention generally comprises a scissor-like member including a first elongate member having a first end, a second end, and an intermediate portion, and also including a second elongate member having a first end, a second end, and an intermediate portion which is hingedly attached to the intermediate portion of the first elongate member; and also includes a first semi-cylindrical member having ends, side edges and being securely attached to the first end of the first elongate member; and further includes a second semi-cylindrical member having ends, side edges and being securely attached to the first end of the second elongate member with each of the side edges of the second semi-cylindrical member being in contactable relationship with a respective one of the side edges of the first semi-cylindrical member; and also includes a heating means for heating the first and second semi-cylindrical members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pipe heating device which has many of the advantages of the portable water line heating device mentioned heretofore and many novel features that result in a new pipe heating device which is not anticipated, rendered obvious, suggested, or even implied by any of the prior art portable water line heating device, either alone or in any combination thereof.

It is another object of the present invention to provide a new pipe heating device which may be easily and efficiently manufactured and marketed.

It is a further object of the present invention to provide a new pipe heating device which is of a durable and reliable construction.

An even further object of the present invention is to provide a new pipe heating device which is susceptible of a low cost of manufacture with regard to both materials and labor, and which accordingly is then susceptible of low prices of sale to the consuming public, thereby making such pipe heating device economically available to the buying public.

Still yet another object of the present invention is to provide a new pipe heating device which provides in the apparatuses and methods of the prior art some of the advantages thereof, while simultaneously overcoming some of the disadvantages normally associated therewith.

Still another object of the present invention is to provide a new pipe heating device for conveniently thawing out pipelines.

Yet another object of the present invention is to provide a new pipe heating device which includes a scissor-like member including a first elongate member having a first end, a second end, and an intermediate portion, and also including a second elongate member having a first end, a second end, and an intermediate portion which is hingedly attached to the intermediate portion of the first elongate member; and also includes a first semi-cylindrical member having ends, side edges and being securely attached to the first end of the first elongate member; and further includes a second semi-cylindrical member having ends, side edges and being securely attached to the first end of the second elongate member with each of the side edges of the second semi-cylindrical member being in contactable relationship with a respective one of the side edges of the first semi-cylindrical member; and also includes a heating means for heating the first and second semi-cylindrical members.

Still yet another object of the present invention is to provide a new pipe heating device that is easy and convenient to clamp about a portion of a pipe to be thawed.

Even still another object of the present invention is to provide a new pipe heating device that saves the user substantial time in thawing out pipes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
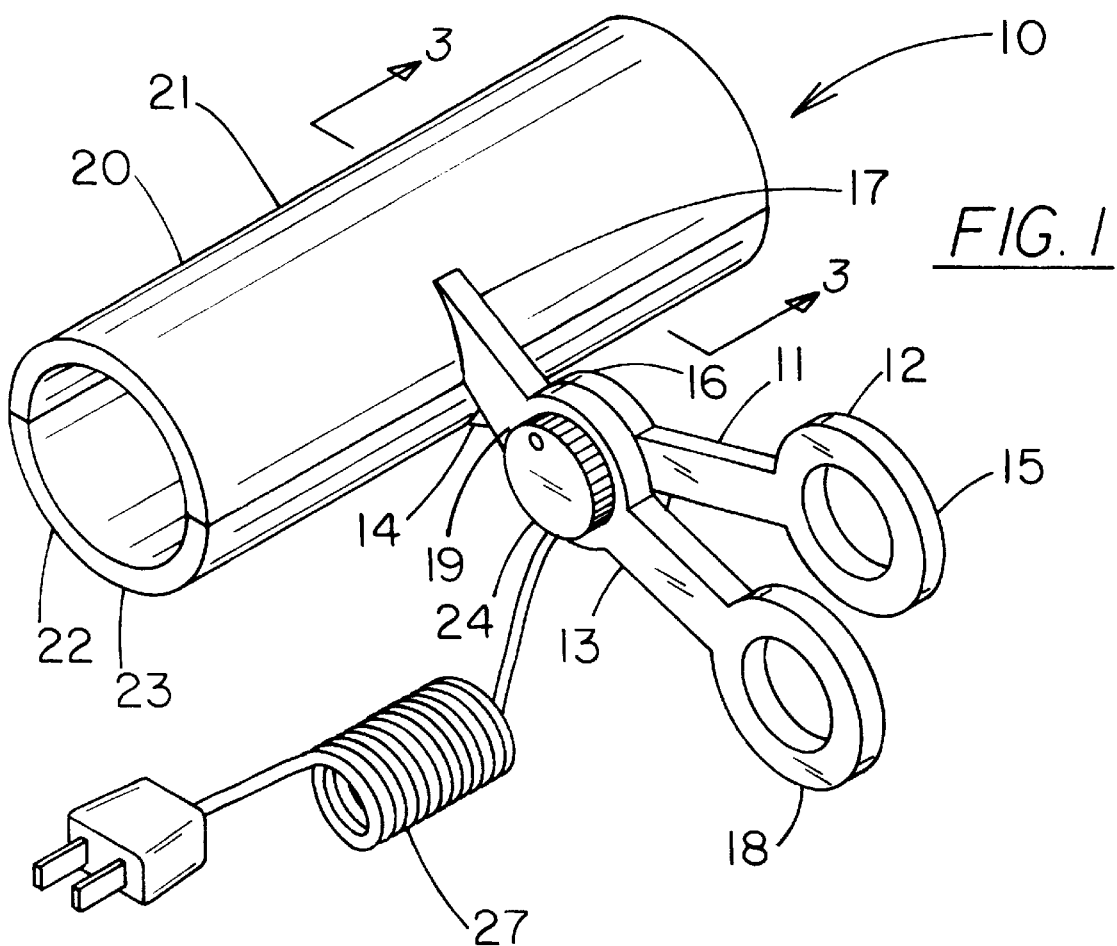
FIG. 1 is a perspective view of a new pipe heating device according to the present invention.
Figure 2:
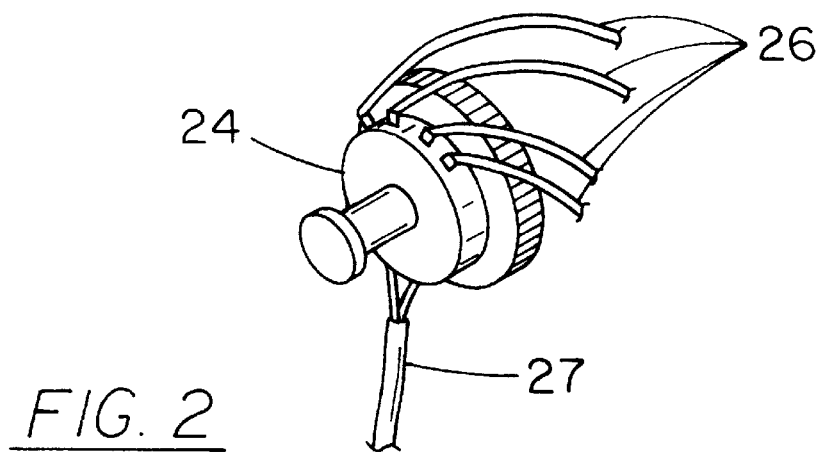
FIG. 2 is a detailed perspective view of heat control member and wires of the present invention.
Figure 3:
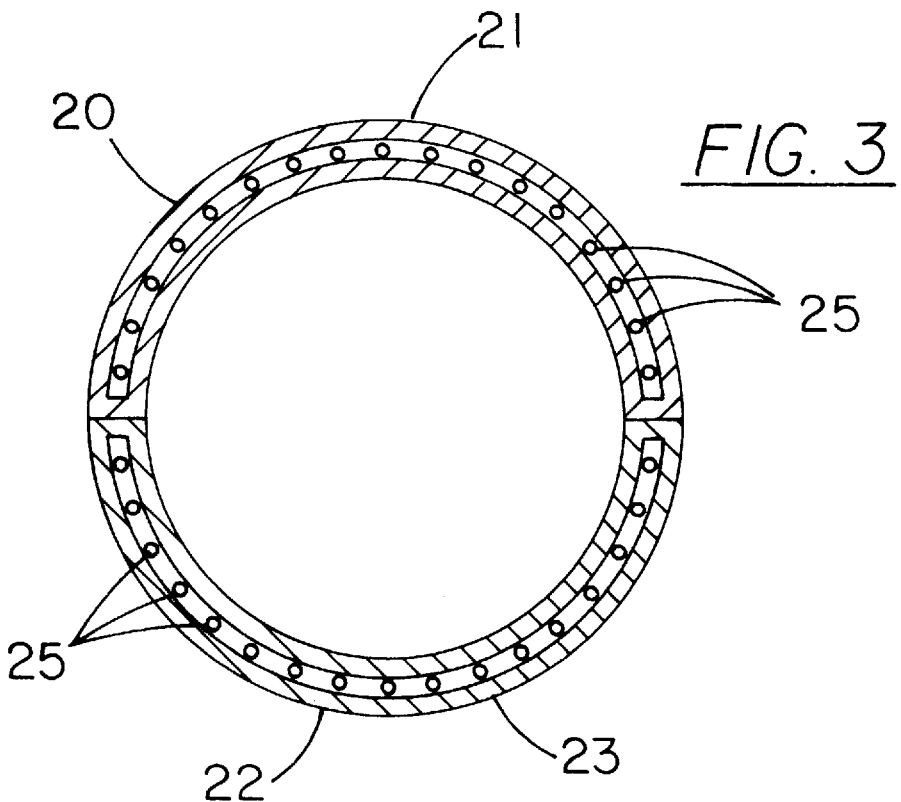
FIG. 3 is a cross-sectional view of the semi-cylindrical members and heating elements of the present invention.
Figure 4:
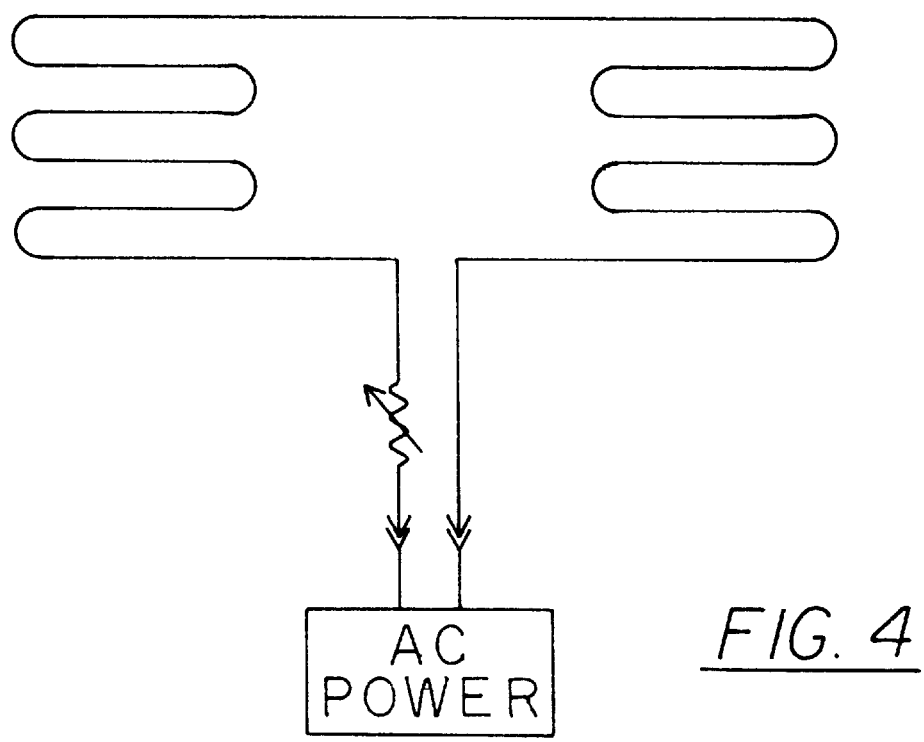
FIG. 4 is a schematic diagram of the present invention.

With reference now to the drawings, and in particular to FIGS. 1 through 4 thereof, a new pipe heating, device embodying the principles and concepts of the present invention and generally designated by the reference numeral 10 will be described.

As best illustrated in FIGS. 1 through 4, the pipe heating device 10 generally comprises a scissor-like member 11 including a first elongate member 12 having a first end 14, a second end 15, and an intermediate portion 16, and also including a second elongate member 13 having a first end 17, a second end 18, and an intermediate portion 19 which is hingedly attached to the intermediate portion 16 of the first elongate member 11.

A first semi-cylindrical member 22 having ends, side edges is securely and conventionally attached to the first end 14 of the first elongate member 11 with the first semi-cylindrical member 22 being disposed generally perpendicular to the first elongate member 11. The first elongate member 11 is securely and conventionally attached to an outer side of a wall 23 of the first semi-cylindrical member 22 intermediate of the ends thereof and near one of the side edges thereof.

A second semi-cylindrical member 20 having ends, side edges is securely and conventionally attached to the first end 17 of the second elongate member 13 with each of the side edges of the second semi-cylindrical member 20 being in contactable relationship with a respective one of the side edges of the first semi-cylindrical member 22. The second semi-cylindrical member 20 is disposed generally perpendicular to the second elongate member 13 with the second elongate member 13 being securely and conventionally attached to an outer side of a wall 21 of the second semi-cylindrical member 20 intermediate of the ends thereof and near one of the side edges thereof. The first 22 and second 20 semi-cylindrical members have inner sides and are disposed such that the inner sides face each other. The first 22 and second 20 semi-cylindrical members are biasedly closed upon one another to essentially form a cylindrical member and are adapted to securely and closeably fit about a portion of a pipe. The second ends of the elongate members 12,13 have loop portions which are adapted to receive fingers of a user and are adapted to allow a user to grasp the scissor-like member 11 and open and close the semi-cylindrical members 20,22 from about a pipe.

Means for heating the first 22 and second 20 semi-cylindrical members includes heating elements 25 which are conventionally disposed within the walls thereof, and also includes wires 26 conventionally connected to the heating elements 25, and further includes a heat control member 24 which is essentially a dial and which is pivotally and conventionally mounted upon the intermediate portion 19 of one of the elongate members 13 and which is conventionally connected to the wires 26, and also includes a power cord 27 being conventionally connected to the heat control member 24 and being adapted to be plugged into a power source.

In use, the user fits one's fingers through the loop portions of the elongate members 12,13 and opens the semi-cylindrical members 20,22 away from one another so that the user can clamp the semi-cylindrical members 20,22 about the portion of the pipe selected to be heated. After doing so, the user than turns the heat control element 24 to allow electricity to flow from the power cord 27 which is plugged into a convenient electrical outlet through the wires 26 and the heating elements 25 thus causing the semi-cylindrical members 20,22 to heat which is transferred to the portion of the pipe being heated.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A pipe heating device comprising;
   a scissor-like member including a first elongate member having a first end, a second end, and an intermediate portion, and also including a second elongate member having a first end, a second end, and an intermediate portion which is hingedly attached to said intermediate portion of said first elongate member;
   a first semi-cylindrical member having ends, side edges and being securely attached to said first end of said first elongate member;
   a second semi-cylindrical member having ends, side edges and being securely attached to said first end of said second elongate member, each of said side edges of said second semi-cylindrical member being in contactable relationship with a respective one of said side edges of said first semi-cylindrical member;
   means for heating said first and second semi-cylindrical members; and
   wherein said means for heating said first and second semi-cylindrical members includes heating elements which are disposed within said walls thereof, and also includes wires connected to said heating elements, and further includes a heat control member pivotally mounted upon said intermediate portion of one of said elongate member and being connected to said wires, and also includes a power cord being connected to said heat control member and being adapted to be plugged into a power source.

2. A pipe heating device as described in claim 1, wherein said first semi-cylindrical member is disposed generally perpendicular to said first elongate member, said first elongate member being securely attached to an outer side of a wall of said first semi-cylindrical member intermediate of said ends thereof and near one of said side edges thereof.

3. A pipe heating device as described in claim 1, wherein said second semi-cylindrical member is disposed generally perpendicular to said second elongate member, said second elongate member being securely attached to an outer side of a wall of said second semi-cylindrical member intermediate of said ends thereof and near one of said side edges thereof.

4. A pipe heating device as described in claim 1, wherein said first and second semi-cylindrical members have inner sides and are disposed such that said inner sides face each other, said first and second semi-cylindrical members being biasedly closed upon one another to essentially form a cylindrical member and being adapted to securely and closeably fit about a portion of a pipe.

5. A pipe heating device as described in claim 1, wherein said second ends of said elongate members have loop portions which are adapted to receive fingers of a user and arc adapted to allow a user to grasp said scissor-like member and open and close said semi-cylindrical members from about a pipe.

6. A pipe heating device comprising:
   a scissor-like member including a first elongate member having a first end, a second end, and an intermediate portion, and also including a second elongate member having a first end, a second end, and an intermediate portion which is hingedly attached to said intermediate portion of said first elongate member;
   a first semi-cylindrical member having ends, side edges and being securely attached to said first end of said first elongate member;
   a second semi-cylindrical member having ends, side edges and being securely attached to said first end of said second elongate member, each of said side edges of said second semi-cylindrical member being in contactable relationship with a respective one of said side edges of said first semi-cylindrical member;
   means for heating said first and second semi-cylindrical members; and
   wherein said second ends of said elongate members have loop portions which arc adapted to receive fingers of a user and are adapted to allow a user to grasp said scissor-like member and open and close said semi-cylindrical members about a pipe.

7. A pipe heating device as described in claim 6, wherein said first semi-cylindrical member is disposed generally perpendicular to said first elongate member, said first elongate member being securely attached to an outer side of a wall of said first semi-cylindrical member intermediate of said ends thereof and near one of said side edges thereof.

8. A pipe heating device as described in claim 6, wherein said second semi-cylindrical member is disposed generally perpendicular to said second elongate member, said second elongate member being securely attached to an outer side of a wall of said second semi-cylindrical member intermediate of said ends thereof and near one of said side edges thereof.

9. A pipe heating device as described in claim 6, wherein said first and second semi-cylindrical members have inner sides and are disposed such that said inner sides face each other, said first and second semi-cylindrical members being biasedly closed upon one another to essentially form a cylindrical member and being adapted to securely and closeably fit about a portion of a pipe.

10. A pipe heating device comprising;
    a scissor-like member including a first elongate member having a first end, a second end, and an intermediate portion, and also including a second elongate member having a first end, a second end, and an intermediate portion which is hingedly attached to said intermediate portion of said first elongate member;
    a first semi-cylindrical member having ends, side edges and being securely attached to said first end of said first elongate member, said first semi-cylindrical member being disposed generally perpendicular to said first elongate member, said first elongate member being securely attached to an outer side of a wall of said first semi-cylindrical member intermediate of said ends thereof and near one of said side edges thereof;
    a second semi-cylindrical member having ends, side edges and being securely attached to said first end of said second elongate member, each of said side edges of said second semi-cylindrical member being in contactable relationship with a respective one of said side edges of said first semi-cylindrical member, said second semi-cylindrical member being disposed generally perpendicular to said second elongate member, said second elongate member being securely attached to an outer side of a wall of said second semi-cylindrical member intermediate of said ends thereof and near one of said side edges thereof, said first and second semi-cylindrical members having inner sides and are disposed such that said inner sides face each other, said first and second semi-cylindrical members being biasedly closed upon one another to essentially form a cylindrical member and being adapted to securely and closeably fit about a pipe, said second ends of said elongate members having loop portions which are adapted to receive fingers of a user and are adapted to allow a user to grasp said scissor-like member and open and close said semi-cylindrical members from about a pipe; and means for heating said first and second semi-cylindrical members including heating elements which are disposed within said walls thereof, and also including wires connected to said heating elements, and further including a heat control member pivotally mounted upon said intermediate portion of one of said elongate member and being connected to said wires, and also including a power cord being connected to said heat control member and being adapted to be plugged into a power source.

* * * * *